United States Patent [19]

Ozaki et al.

[11] Patent Number: 4,718,516
[45] Date of Patent: Jan. 12, 1988

[54] FOUR WHEEL DRIVE UNIT

[75] Inventors: Kiyotaka Ozaki, Yokosuka; Shuuji Torii, Yokohama, both of Japan

[73] Assignee: Nissan Motor Co., Ltd., Yokohama, Japan

[21] Appl. No.: 797,927

[22] Filed: Nov. 14, 1985

[30] Foreign Application Priority Data

Nov. 17, 1984 [JP] Japan ................. 59-242687

[51] Int. Cl.$^4$ .................. B60K 17/34; F16D 43/21
[52] U.S. Cl. ..................... 180/233; 180/247; 192/54; 192/93 A
[58] Field of Search .............. 192/54, 93 A; 180/233, 180/247, 248

[56] References Cited

U.S. PATENT DOCUMENTS

| | | | |
|---|---|---|---|
| 4,466,502 | 8/1984 | Sakai | 180/248 |
| 4,481,877 | 11/1984 | Takano et al. | 180/233 |
| 4,484,654 | 11/1984 | Hayakawa | 180/248 |
| 4,566,554 | 1/1986 | Suzuki | 180/247 |

FOREIGN PATENT DOCUMENTS

| | | |
|---|---|---|
| 0043237 | 6/1980 | European Pat. Off. . |
| 152623 | 11/1980 | Japan ................. 180/247 |
| 58-30835 | 2/1983 | Japan . |
| 314617 | 4/1928 | United Kingdom . |
| 2102907 | 2/1983 | United Kingdom ............. 180/233 |
| 2132146 | 7/1984 | United Kingdom . |

Primary Examiner—Rodney H. Bonck
Assistant Examiner—David A. Testardi
Attorney, Agent, or Firm—Schwartz, Jeffery, Schwaab, Mack, Blumenthal & Evans

[57] ABSTRACT

A four wheel drive unit is provided with a friction clutch interposed between an input shaft and a front wheel output shaft. The clutch is urged toward engagement with an increasing force as output torque of a rear wheel output shaft increases for thereby increasing engine power transmitted from the input shaft to front road wheels while urged toward disengagement with an increasing force as steering effort on a steering wheel increases for thereby reducing engine power transmitted from the input shaft to the front road wheels.

9 Claims, 4 Drawing Figures

FOUR WHEEL DRIVE UNIT

BACKGROUND OF THE INVENTION

1. Field of the Invention

The present invention relates in general to drive systems for four wheel drive vehicles and more particularly to a four wheel drive unit automatically engaged and disengaged to provide four wheel drive and two wheel drive selectively in response to variations of vehicle travelling conditions.

2. Description of the Prior Art

A prior art four wheel drive unit of the above mentioned kind, as for example disclosed in the Japanese Provisional Patent Publication No. 58-30835, consists of a transfer clutch adapted to be operated by line pressure of a hydraulic control unit of an automatic transmission in such a manner as to provide four wheel drive and two wheel drive selectively in response to variations of vehicle travelling conditions, i.e., in such a manner as to provide four wheel drive upon low-speed high-load travelling conditions and two wheel drive upon high-speed low-load travelling conditions of the vehicle.

The prior art four wheel drive unit, however, is not adapted to actively respond to whether the vehicle is travelling a corner. Due to this, even upon turning on a dry, smoothly surfaced road where two wheel drive is desirable, the drive unit may possibly be engaged to provide four wheel drive, causing problems of a tight corner braking phenomenon and an inability of controlling the behaviour of the vehicle through control of an accelerator pedal.

SUMMARY OF THE INVENTION

In accordance with the present invention, there is provided a novel and improved four wheel drive unit which comprises an input shaft supplied with engine power, a first output shaft drivingly connected to the first input shaft and a first pair of road wheels for constantly transmitting engine power from the input shaft to the first pair of road wheels, a second output shaft drivingly connected to a second pair of road wheels, a friction clutch interposed between the input shaft and the second output shaft for variably transmitting engine power from the input shaft to the second pair of road wheels, clutch engaging means for engaging the clutch with an increasing force as output torque of the first output shaft increases and thereby increasing engine power transmitted from the input shaft to the second output shaft, and clutch disengaging means for disengaging the clutch with an increasing force as steering effort of the vehicle increases and thereby reducing engine power transmitted from the input shaft to the output shaft.

The above structure is quite effective for overcoming the above noted disadvantages and shortcomings inherent in the prior art device.

It is accordingly an object of the present invention to provide a novel and improved four wheel drive unit for a motor vehicle which can improve the running ability or travelling efficiency of the vehicle.

It is another object of the present invention to provide a novel and improved four wheel drive unit of the aforementioned character which can effectively prevent the tight corner brake of the vehicle.

It is a further object of the present invention to provide a novel and improved four wheel drive unit of the aforementioned character which makes it easy to control the behaviour of the vehicle through control of the accelerator pedal.

BRIEF DESCRIPTION OF THE DRAWINGS

The features and advantages of the four wheel drive unit according to the present invention will become more clearly appreciated from the following description taken in conjunction with the accompanying drawings, in which.

DETAILED DESCRIPTION OF THE PREFERRED EMBODIMENT

Figure 1:
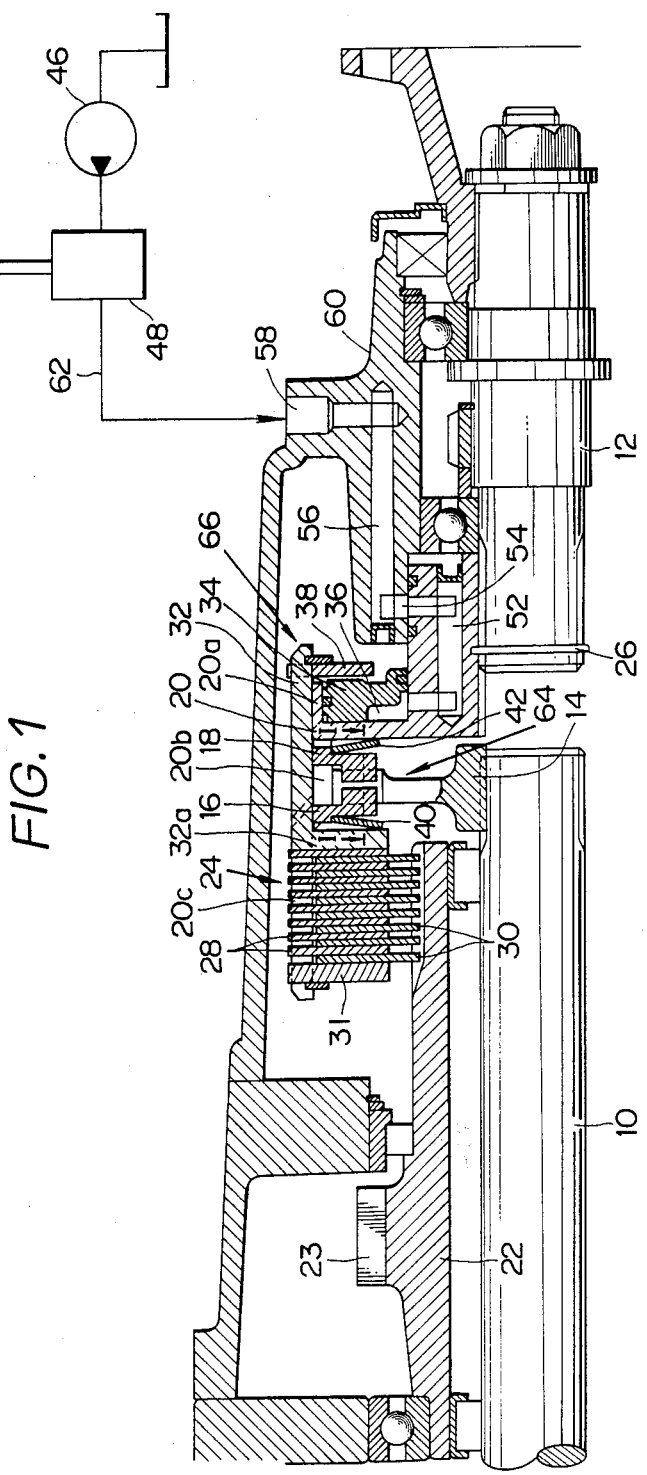
FIG. 1 is a sectional view of a four wheel drive unit according to the present invention, with some parts being partially broken away and some parts being diagrammatically shown.
Figure 2:
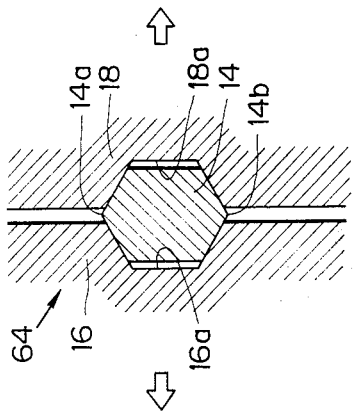
FIG. 2 is a sectional view taken along the line II—II of FIG. 1.

Referring to FIGS. 1 and 2, a four wheel drive unit according to the present invention is shown by way of example as being of the kind which provides rear wheel drive when disengaged and comprising an input shaft 10 to which engine power is supplied through a transmission (not shown), a rear wheel output shaft 12 axially aligned with the input shaft 10 and adapted to be supplied with output of the input shaft 10 through a drive cam wheel 14, a pair of driven cam plates 16 and 18 and a rear drum 20, and a hollow front wheel output shaft 22 disposed concentrically with the input shaft 10 and adapted to be supplied with output of the input shaft 10 through the drive cam wheel 14, the driven cam plates 16 and 18, the front drum 20 and a multiple disc clutch 24.

More specifically, the rear wheel output shaft 12 is drivingly connected to rear road wheels of a vehicle (not shown) in such a manner as to constantly transmit output of the transmission to the rear road wheels, while the front wheel output shaft 22 is rotatable on the input shaft 10 and drivingly connected through a front wheel drive gear 23 to front road wheels (not shown) in such a manner as to variably transmit output of the transmission to the front road wheels. The drive cam wheel 14 is splined at its hub portion to an end of the input shaft 10 and has a plurality of spoke portions the free ends of which are hexagonal in cross section and each includes a pair of wedge-shaped cam surfaces 14a and 14b spaced circumferentially of the drive cam wheel 14. The driven cam plates 16 and 18 are ring-shaped, each of which is formed with a plurality of radial depressions 16a or 18a of a taperzoidal cross section, and disposed concentrically with the drive cam wheel 14 in such a manner as to interpose therebetween the free ends of the spoke portions of the drive cam wheel 14 and receive the same in the radial depressions 16a and 18a. The radial depressions 16a of one driven cam plate 16 and the radial depressions 18a of the other driven cam plate 18 are respectively formed into pairs each of which is fittingly engageable with the aforementioned wedge-shaped cam surfaces 14a and 14b as shown in FIG. 2.

The rear wheel output shaft 12 has an end adjacent the end of the input shaft 10 to which the drive cam wheel 14 is splined. The rear drum 20 has a main body 20a where it is splined to the above mentioned end of the rear wheel output shaft 12 and held axially stationary relative to same by means of a snap ring 26 and also has a slotted outer peripheral extension 20b where it is connected through the multiple disc clutch 24 to the front wheel output shaft 12. The driven cam plates 16 and 18 have slotted outer peripheries and are mounted thereat on the rear drum peripheral extension 20b for axial movement but against rotation relative to same.

The multiple disc clutch 24 mainly consists of a plurality of alternate drive and driven clutch discs 28 and 30, an annular clutch end plate 31 and a front drum 32. The front drum 32 has at an end thereof an inward flange 32a and is axially movably mounted on the rear drum main body 20a. The rear drum 32 and front drum 20 are constructed and arranged so that the rear drum peripheral extension 20b has a free end portion 20c projecting outwardly from the front drum 32 through an end thereof having the inward flange 32a and that the driven cam plates 16 and 18 are interposed between the inward flange 32a and the rear drum main body 20a. The alternate drive and driven clutch discs 28 and 30 are respectively mounted on the free end portion 20c of the rear drum peripheral extension 20b and the front wheel output shaft 22 for axial movement but against rotation relative to same. The clutch end plate 31 is secured to the free end portion 20c of the rear drum peripheral extension 20b and abuttingly engageable with one axial end of the drive and driven clutch discs 28 and 30, while the inward flange 32a of the front drum 32 is abuttingly engageable with the other end of the drive and driven clutch discs 28 and 30.

An annular clutch piston 34 is concentrically mounted in the rear drum main body 20a in such a manner as to define therebetween a hydraulic chamber 36 variable in volume based upon axial movement of the clutch piston 34. An annular drum end plate 38 is secured to an end of the front drum 32 opposite to the end thereof having the inward flange 32a and abuttingly engageable with the clutch piston 34 so that upon movement of the clutch piston 34 in the direction of increasing the volume of the hydraulic chamber 36 the inward flange 32a of the front drum 32 is caused to move away from the drive and driven clutch discs 28 and 30.

A pair of belleville springs or spring discs 40 and 42 are respectively interposed between the front drum inward flange 32a and one driven cam plate 16 and between the front drum main body 20a and the other driven cam plate 18 so as to apply a predetermined preload upon the drive and driven clutch discs.

Figure 3:
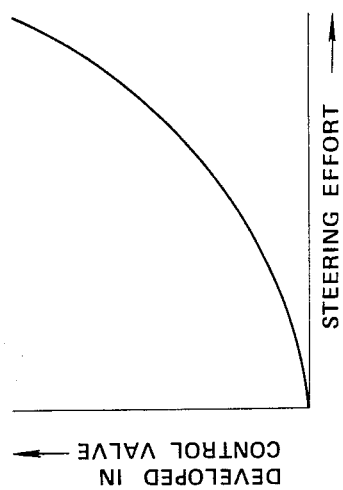
FIG. 3 is a graph showing the relation between steering effort and resulting hydraulic pressure in a power steering servo.

A power steering system is generally indicated by the reference numeral 44 and shown as including an engine-driven oil pump 46 and a control valve 48 fluidly connected to the oil pump 46 and actuated in response to operation of a steering wheel 50. Within the control valve 48, such a fluid pressure is developed that varies in response to variations of steering effort on the steering wheel 50 as shown in FIG. 3.

The hydraulic chamber 36 is fluidly connected to the control valve 48 of the power steering system 44 through conduits 52, 54, 56 and 58 formed in the rear drum 20 and a transmission case 60 and further through a conduit 62 so that fluid pressure, which increases as steering effort increases, is introduced to the hydraulic chamber 36.

In the above, it is to be noted that the drive cam plate 14, driven cam plates 16 and 18, rear drum 20 and the spring discs 40 and 42 constitute a clutch engaging means 64 for engaging the clutch 24 with an increasing force as the torque or output of the input shaft 10 to be transferred through the rear wheel output shaft 12 to the rear road wheels increases. More specifically, upon starting and acceleration of the vehicle, the output torque transferred from the input shaft 10 to the rear wheel output shaft 12 becomes large, thus increasing relative rotation between the input shaft 10 and the rear wheel output shaft 12 and causing the wedge-shaped cam surfaces 14a and 14b of the drive cam wheel 14 to separate the driven cam plates 16 and 18 increasedly for thereby applying an increased clutch engaging force upon the clutch 24.

It is further to be noted that the drum end plate 38, clutch piston 34, hydraulic chamber 36 and the power steering system 44 constitute a clutch disengaging means 66 for disengaging the clutch 24 with an increasing force as steering effort increases. More specifically, upon turning of the vehicle, the fluid pressure developed in the control valve 48 becomes large, thus causing the clutch piston 34 to move rightwardly in the drawing together with the front drum 32 for thereby reducing a clutch engaging force to be applied upon the clutch 24 from the spring discs 40 and 42 and the clutch engaging means 64.

It is still further to be noted that the drive cam wheel 14, driven cam plates 16 and 18 and the rear drum 20 also constitute means for constantly transmitting engine power from the input shaft 10 to the first output shaft 12.

The operation of the four wheel four wheel drive unit of the present invention will now be described.

Figure 4:
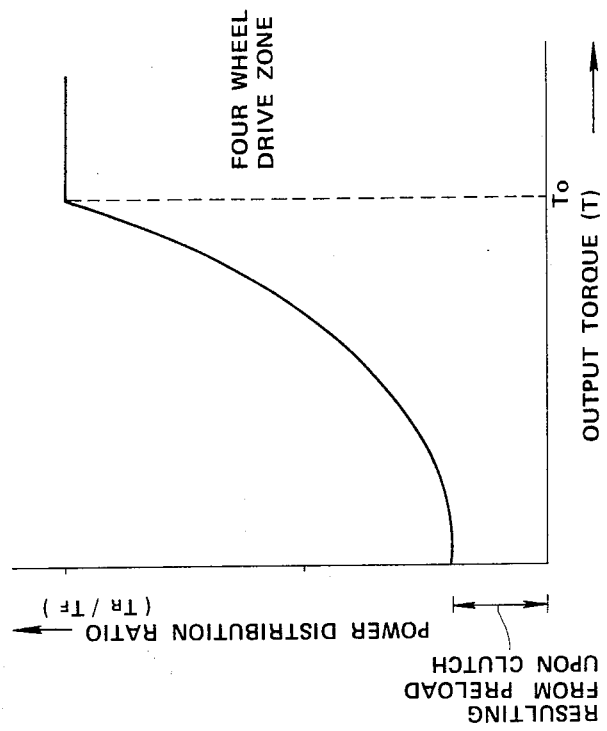
FIG. 4 is a graph showing the relation between torque of a rear wheel axle shaft and power distribution ratio.

Upon straight-ahead travelling of the vehicle, the clutch engaging means 64 applies an increasing clutch engaging force upon the multiple disc clutch 24 as the output torque of the rear wheel output shaft 12 increases. Engine power transmitted through the front wheel output shaft 22 to the front road wheels thus increases as the output torque of the rear wheel output shaft 12 increases, thereby increasingly changing the drive system from rear wheel drive to four wheel drive. FIG. 4 shows a relation of a power distribution ratio $T_R/T_F$ (ratio of power $T_R$ transferred to rear wheel output shaft 12 to power $T_F$ transferred to front wheel output shaft 22) and an outut torque T of the rear wheel output shaft 12. As will be seen from the graph of FIG. 4, the power distribution ratio $T_R/T_F$ increases progressively as the output torque T of the rear wheel output shaft 12 increases up to a predetermined value $T_O$. When the output torque T of the rear wheel output shaft 12 increases beyond the predetermined value $T_O$, the multiple disc clutch 24 is completely engaged, thus changing the drive system into complete four wheel drive. As will be further seen from the graph of FIG. 4, comlete two wheel drive is not attained upon straight-ahead travelling of the vehicle since the multiple disc clutch 24 is partially engaged by a preload applied thereto from the spring discs 40 and 42 even when the output torque T of the rear wheel output shaft 12 is so small. The clutch disengaging means 66 does not affect the operation of the clutch 24 upon straight-ahead travelling of the vehicle since the fluid pressure in the control valve 48 and therefore in the hydraulic chamber 36 is maintained nearly zero.

From the above, it will be understood that upon starting, accelerating and travelling on a highly frictional road, the four wheel drive unit of the present invention provides four wheel drive, whereby to make it possible to attain an excellent straight stability and controllability of the vehicle. It is further to be understood that the four wheel drive unit of the present invention is adapted to vary the power distribution to the front and rear road wheels in response to variations of the output torque T of the rear wheel output shaft 12 upon straight-ahead travelling of the vehicle, whereby the vehicle can travel in a particular drive system between four wheel drive and two wheel drive based upon the output torque T of the rear wheel output shaft 12.

Upon turning of the vehicle, turning of the steering wheel 50 causes within the control valve 48 a fluid pressure which is introduced to the hydraulic chamber 36. The clutch piston 34 is thus urged to move together with the front drum 32 rightwardly in the drawing against the bias of the spring discs 40 and 42 and against the force for separating the driven cam plates 16 and 18, whereby to reduce the clutch engaging force. The drive system of the vehicle is thus changed nearly into two wheel drive even in the case of the vehicle which comes to a corner after having travelled in four wheel drive. For example, since steering effort is so large upon travelling a tight corner of a highly frictional road, the multiple disc clutch 24 is completely disengaged to change the drive system into two wheel drive, thus making it possible for the clutch 24 to absorb the difference in rotation between the front and rear road wheels and thereby effectively preventing the tight corner braking phenomenum. Further, upon controlling the behaviour of the vehicle through control of the accelerator pedal (so-called power slide), steering effort becomes large, thus changing the steering system into two wheel drive and making it easy to perform intended rear slide through control of the accelerator pedal. When the vehicle turns a slippery corner or a low-friction-surface corner, steering effort does not become large to allow the steering system to remain in four wheel drive, whereby to make it possible to attain an excellent cornering stability and controllability of the vehicle under this travelling condition of the vehicle.

From the foregoing, it is to be understood that the four wheel drive unit of the present invention is provided with clutch engaging means for engaging the clutch with an increasing force as output shaft (rear wheel output shaft) increases and thereby increasing power distribution to another output shaft (front wheel output shaft) and also provided with clutch disengaging means for disengaging the clutch with an increasing force as steering effort increases, whereby upon straight-ahead travelling of the vehicle the drive system is changed from two wheel drive into four wheel drive while upon travelling a corner the clutch engaging force is reduced in response to increase of steering effort for thereby allowing the drive system to become close to two wheel drive increasingly, thus making it possible to suitably change power distribution to front and rear road wheels based upon variations of vehicle travelling conditions and thereby improve vehicle travelling characteristics.

What is claimed is:

1. A four wheel drive unit for an engine-powered road vehicle, comprising:
an input shaft supplied with engine power;
a first output shaft drivingly connected to said input shaft and a first pair of road wheels for constantly transmitting engine power from said input shaft to said first pair of road wheels;
a second output shaft drivingly connected to a second pair of road wheels;
a friction clutch interposed between said input shaft and said second output shaft for variably transmitting engine power from said input shaft to said second pair of road wheels;
clutch engaging means for engaging said clutch with an increasing force as output torque of said first output shaft increases and thereby increasing engine power transmitted from said input shaft to said second output shaft; and
clutch disengaging means for disengaging said clutch with an increasing force as steering effort of the vehicle increases and thereby reducing engine power transmitted from said input shaft to said second output shaft.

2. A four wheel drive unit as set forth in claim 1, in which said input shaft and said first output shaft are axially aligned with each other, and in which said second output shaft is hollow and rotatably mounted on said input shaft.

3. A four wheel drive unit as set forth in claim 2, in which said clutch engaging means comprises a drive cam wheel drivingly connected at its hub portion to an end of said input shaft and having a plurality of spoke portions each of which has at the free end thereof a pair of wedge-shaped cam surfaces spaced circumferentially of said drive cam wheel, and a pair of ring-shaped driven cam plates having a plurality of radial depressions and concentrically disposed with said drive cam wheel in such a manner as to interpose therebetween the free ends of said spoke portions and receive the same in said radial depressions, said radial depressions of one of said driven cam plates and said radial depressions of the other of said driven cam plates being respectively formed into pairs each of which is fittingly engageable with wedged-shaped cam surfaces, said driven cam plates being drivingly connected to said first output shaft and axially movable away from each other being separated by said wedged-shaped cam surfaces of said drive cam wheel upon increase of output torque of said first output shaft.

4. A four wheel drive unit as set forth in claim 3, in which said clutch engaging means further comprises a rear drum having a main body where it is drivingly connected to an end of said first output shaft adjacent said end of said input shaft and held axially stationarily relative to same and also having a slotted outer peripheral extension where it is connected through said friction clutch to said second output shaft, said driven cam plates having slotted outer peripheries and mounted thereat on said peripheral extension of said rear drum for axial movement but against rotation relative to same.

5. A four wheel drive unit as set forth in claim 4, in which said friction clutch comprises a front drum having at an end thereof an inward flange and axially movably mounted on said rear drum, said front drum and said rear drum being constructed and arranged so that said peripheral extension of said rear drum has a free end portion projecting outwardly from said front drum through an end thereof having said inward flange and that said driven cam plates are interposed between said inward flange and said main body of said rear drum, said friction clutch further comprising a plurality of alternate drive and driven clutch discs respectively mounted on said free end portion of said peripheral extension of said rear drum and said second output shaft for axial movement but against rotation relative to same and a clutch end plate secured to said free end portion of said peripheral extension of said rear drum and abuttingly engageable with one axial end of said drive and driven clutch discs, said inward flange of said front drum being abuttingly engageable with the other end of said drive and driven clutch discs.

6. A four wheel drive unit as set forth in claim 5, in which said clutch engaging means further comprises a pair of spring discs respectively interposed between said inward flange of said front drum and one of said driven cam plates and between said main body of said front drum and the other of said driven cam plates so as to apply a predetermined preload upon said drive and driven clutch discs.

7. A four wheel drive unit as set forth in claim 6, in which said drive cam wheel, driven cam plates and said front drum also constitute means for constantly transmitting engine power from said input shaft to said first output shaft.

8. A four wheel drive unit as set forth in claim 7, in which said clutch disengaging means comprises an annular clutch piston concentrically mounted in said main body of said rear drum in such a manner as to define therebetween a hydraulic chamber variable in volume based upon axial movement of said clutch piston, and an annular drum end plate secured to an end of said front drum opposite to said end of said front drum having said inward flange and abuttingly engageable with said clutch piston so that upon movement of said clutch piston in the direction of increasing the volume of said hydraulic chamber said inward flange of said front drum is caused to move away from said drive and driven friction discs against the bias of said spring discs and a force applied thereto from said driven cam plates.

9. A four wheel drive unit as set forth in claim 8, in which said clutch disengaging means further comprises a power steering system having an engine-driven oil pump, a steering wheel and a control valve fluidly connected to said oil pump and actuated by said steering wheel in such a manner as to develop a fluid pressure that increases as steering effort on said steering wheel increases, said hydraulic chamber being fluidly connected to said control valve so as to introduce the fluid pressure developed in the latter to the former.

* * * * *